(12) United States Patent
Tsukasaki et al.

(10) Patent No.: US 8,364,347 B2
(45) Date of Patent: Jan. 29, 2013

(54) LEFT-RIGHT INDEPENDENT STEERING DEVICE FOR STEERING LEFT AND RIGHT WHEELS INDEPENDENTLY

(75) Inventors: Yuichiro Tsukasaki, Tokyo (JP); Masaru Kogure, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 978 days.

(21) Appl. No.: 12/007,389

(22) Filed: Jan. 9, 2008

(65) Prior Publication Data

US 2008/0167778 A1 Jul. 10, 2008

(30) Foreign Application Priority Data

Jan. 10, 2007 (JP) .................................. 2007-2816

(51) Int. Cl.
*G06F 19/00* (2006.01)
*B62D 5/04* (2006.01)
*A01B 69/00* (2006.01)

(52) U.S. Cl. .............. 701/41; 180/444; 74/495; 74/496; 74/110; 280/771; 280/93.502; 464/162

(58) Field of Classification Search ............ 180/79.1, 180/152, 153, 140, 444, 443; 74/492, 495, 74/496, 110, 491, 493; 701/41; 280/771, 280/93.502; 464/162
See application file for complete search history.

(56) References Cited

U.S. PATENT DOCUMENTS

| | | | | | |
|---|---|---|---|---|---|
| 4,683,971 A | * | 8/1987 | Westercamp et al. | ......... | 180/444 |
| 4,741,409 A | * | 5/1988 | Westercamp et al. | ......... | 180/413 |
| 5,213,175 A | * | 5/1993 | Feindel | .......................... | 180/428 |
| 5,460,235 A | * | 10/1995 | Shimizu | .......................... | 180/446 |
| 5,941,339 A | * | 8/1999 | Shimizu et al. | ................ | 180/444 |
| 5,975,573 A | * | 11/1999 | Belleau | .......................... | 280/771 |
| 6,006,853 A | * | 12/1999 | Shimizu et al. | ................ | 180/444 |
| 6,012,730 A | * | 1/2000 | Shimizu et al. | .............. | 280/80.1 |
| 7,444,900 B2 | * | 11/2008 | Tomaru et al. | .................. | 74/495 |
| 2004/0194570 A1 | * | 10/2004 | Tomaru et al. | .................. | 74/495 |
| 2004/0261564 A1 | * | 12/2004 | Sato | .................................. | 74/492 |
| 2006/0027417 A1 | * | 2/2006 | Segawa | .......................... | 180/444 |
| 2006/0117889 A1 | * | 6/2006 | Segawa et al. | .................. | 74/425 |
| 2007/0107973 A1 | * | 5/2007 | Jiang et al. | ..................... | 180/443 |
| 2010/0242665 A1 | * | 9/2010 | Nagamura et al. | .............. | 74/493 |

FOREIGN PATENT DOCUMENTS

JP 2006-56374 3/2006

* cited by examiner

*Primary Examiner* — Ronnie Mancho

(74) *Attorney, Agent, or Firm* — Smith, Gambrell & Russell, LLP

(57) ABSTRACT

A small-size, highly-reliable left-right independent steering device is provided without having to make significant modifications to existing vehicles or to develop dedicated vehicles. The device includes tie rods linked to left and right front wheels and axially expandable and contractible by means of small-size telescopic mechanism portions defined by ball-screw-type linear actuators. Each telescopic mechanism portion mainly includes a main body to which a tie-rod end of the corresponding tie rod is fixed, and an electric motor serving as an actuator attached substantially perpendicularly to the main body. The other end of the tie rod is coupled to a steering rod and functions as a piston rod that can advance or recede in the axial direction by means of the telescopic mechanism portion. Thus, the telescopic mechanism portions are mountable within tire wheels at positions free of, for example, suspension arms and stabilizers located near the tie rods.

10 Claims, 8 Drawing Sheets

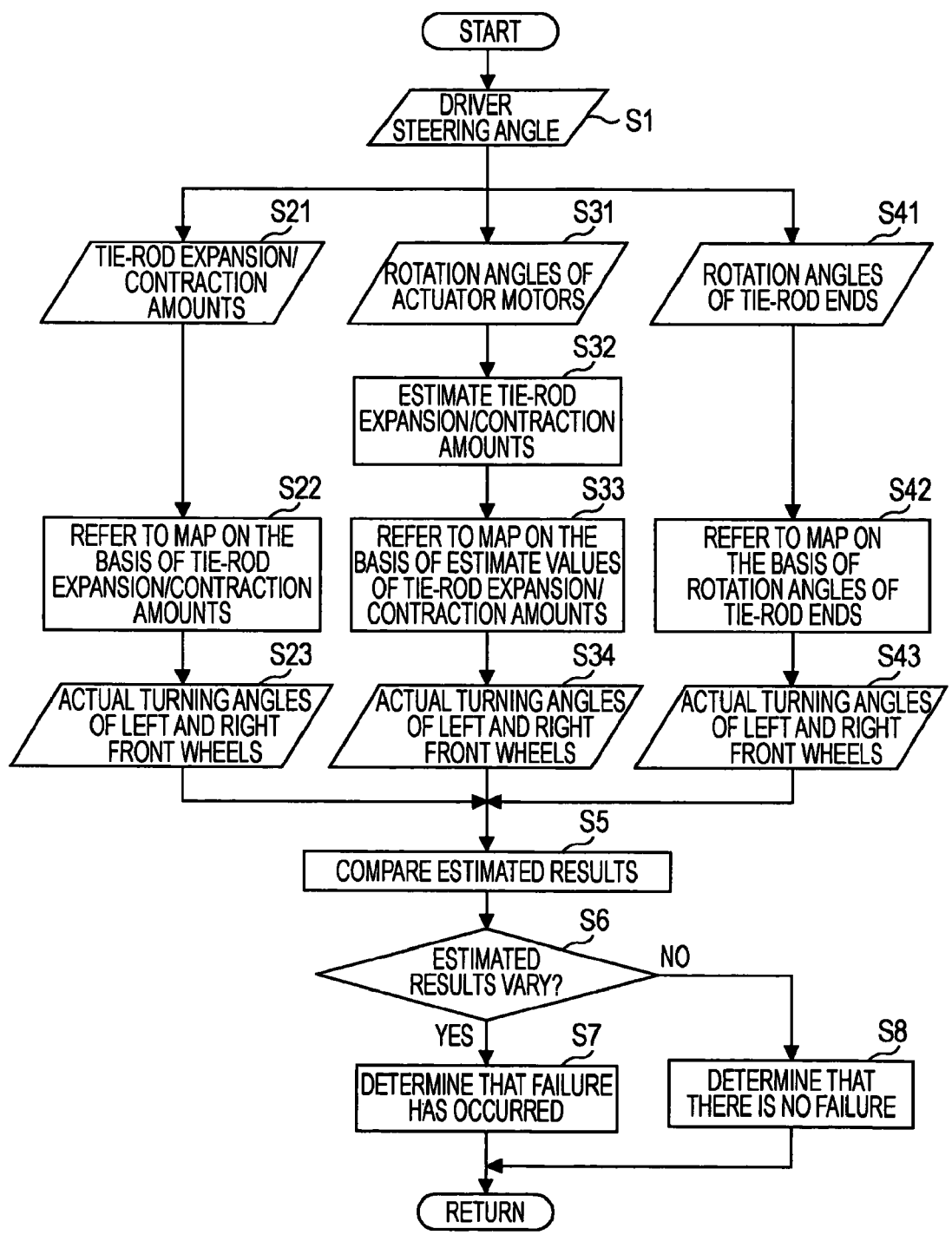

LEFT-RIGHT INDEPENDENT STEERING DEVICE FOR STEERING LEFT AND RIGHT WHEELS INDEPENDENTLY

CROSS REFERENCES TO RELATED APPLICATIONS

The disclosure of Japanese Patent Application No. 2007-002816 filed on Jan. 10, 2007 including the specifications, drawings, and abstracts are incorporated by reference herein.

BACKGROUND OF THE INVENTION

1. Field of the Invention

The present invention relates to left-right independent steering devices for steering left and right wheels independently by controlling individual lengths of tie rods by extraction/contraction.

2. Description of the Related Art

With the aim of improving steering stability, usability, and stability of vehicles such as automobiles, there have been developed devices that can independently adjust turning angles or toe angles of left and right wheels. Recently, various types of systems have been developed that no longer have a mechanical linkage between the turning wheels and the steering wheel. One typical example is a steer-by-wire system in which steering control is performed by electrically detecting a driver's steering operation.

However, steer-by-wire systems have various problems to be solved due to being insufficient in reliability, requiring installation of a high-voltage (e.g. DC 42 V) power source, and requiring implementation of appropriate control of steering reaction force. For these reasons, a new vehicle design is required to apply a steer-by-wire system. Therefore, left-right independent steering technologies are still predominantly realized based on the conventional devices or technologies that apply the mechanical linkage between the turning wheels and the steering wheel. An example of such a left-right independent steering device is disclosed in Japanese Unexamined Patent Application Publication No. 2006-56374.

In the steering device disclosed in Japanese Unexamined Patent Application Publication No. 2006-56374, auxiliary rack bar mechanisms that advance or recede in response to rotation of a motor are provided at opposite ends of a rack bar that extends leftward and rightward from a gear box located at a lower end of a steering shaft. These auxiliary rack bar mechanisms transmit their advancing or receding motion to respective tie rods so that the left and right wheels can be steered individually with knuckle arms. When a difference in operation forces acting on the left and right turning wheels during forward movement of the vehicle is greater than or equal to a predetermined value, the steering amount of at least one of the left and right turning wheels is controlled by driving the corresponding auxiliary rack bar mechanism. Accordingly, this can reduce the effect of the operation forces acting on the turning wheels from the road surface.

However, the steering device disclosed in Japanese Unexamined Patent Application Publication No. 2006-56374 has difficulties in view of mountability. Specifically, since the rack bar extending from the opposite sides of the gear box is provided with rod-length adjusting mechanisms and actuators (motors), the foot space for the driver at the vehicle interior side may have to be reduced in order to avoid interference with peripheral components such as suspension arms and stabilizers. This implies that significant modifications to existing vehicles or development of dedicated vehicles will need to be made, thus unfavorably eliminating the capability to use existing devices and technologies.

Furthermore, in order to perform independent steering control of left and right wheels by driving the respective actuators, it is necessary to obtain accurate and highly reliable information about actual turning angles of the wheels. Japanese Unexamined Patent Application Publication No. 2006-56374 does not particularly discuss this point and therefore leaves room for improvement.

SUMMARY OF THE INVENTION

Accordingly, it is an object of the present invention to provide a small-size, highly-reliable left-right independent steering device without having to make significant modifications to existing vehicles or to develop dedicated vehicles.

In order to achieve the aforementioned object, the present invention provides a left-right independent steering device for independently controlling turning angles of left and right wheels of a vehicle. The left-right independent steering device includes telescopic mechanism portions provided on tie rods located at opposite ends of a steering shaft that operates in conjunction with a steering operation, each telescopic mechanism portion being expandable and contractible by means of a ball screw so as to respectively increase and decrease a length of the corresponding tie rod; actuators connected to the telescopic mechanism portions so as to rotationally drive the ball screws, each actuator being disposed such that a drive shaft thereof is substantially perpendicular to an advancing/receding axis of the corresponding ball screw; and controlling means configured to control driving of the actuators in accordance with the steering operation.

According to the present invention, a small-size, highly-reliable left-right independent steering device can be attained without having to make significant modifications to existing vehicles or to develop dedicated vehicles.

BRIEF DESCRIPTION OF THE DRAWINGS

FIG. 5 is a flow chart of a failure diagnosis process according to the first embodiment;

DESCRIPTION OF THE PREFERRED EMBODIMENTS

Figure 1:
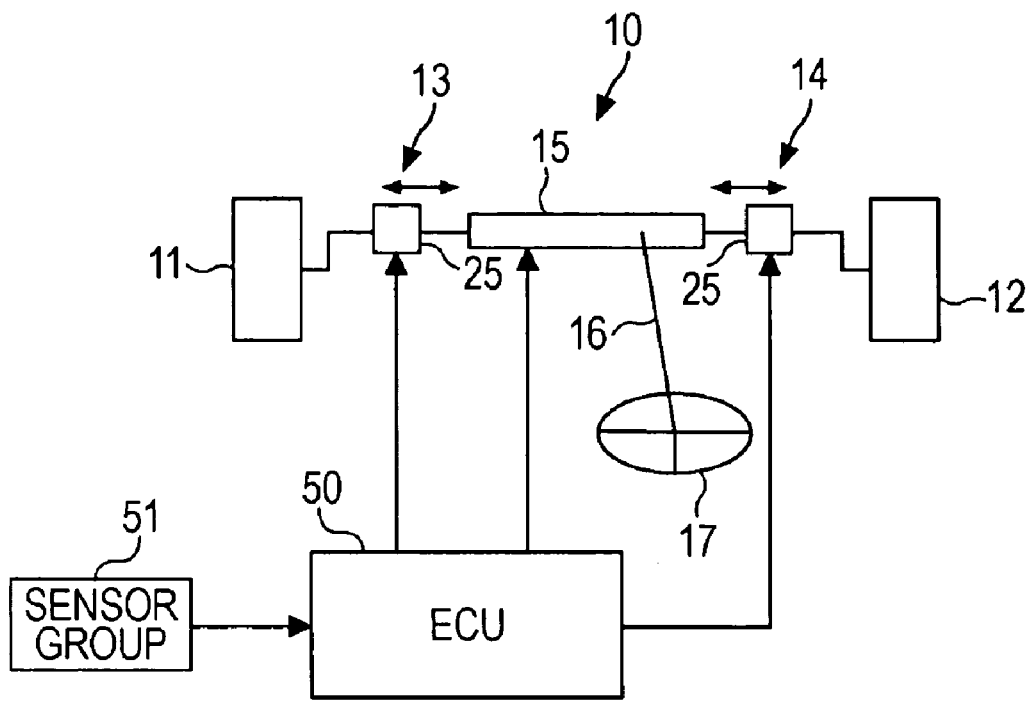
FIG. 1 schematically illustrates a left-right independent steering device according to a first embodiment of the present invention.

Embodiments of the present invention will now be described with reference to the drawings. FIGS. 1 to 5 correspond to a first embodiment of the invention. FIG. 1 schematically illustrates a left-right independent steering device for steering left and right wheels independently.

Figure 2:
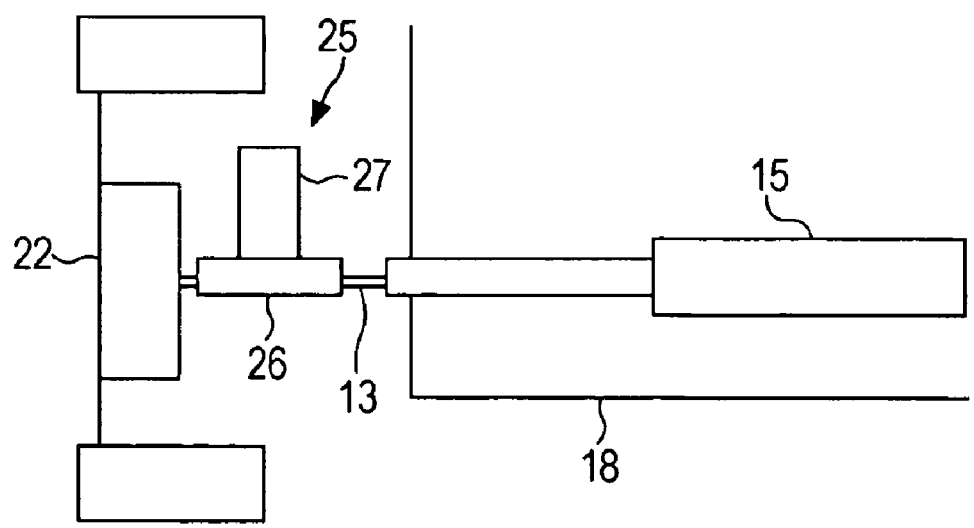
FIG. 2 illustrates the layout of one of telescopic mechanism portions according to the first embodiment.
Figure 3:
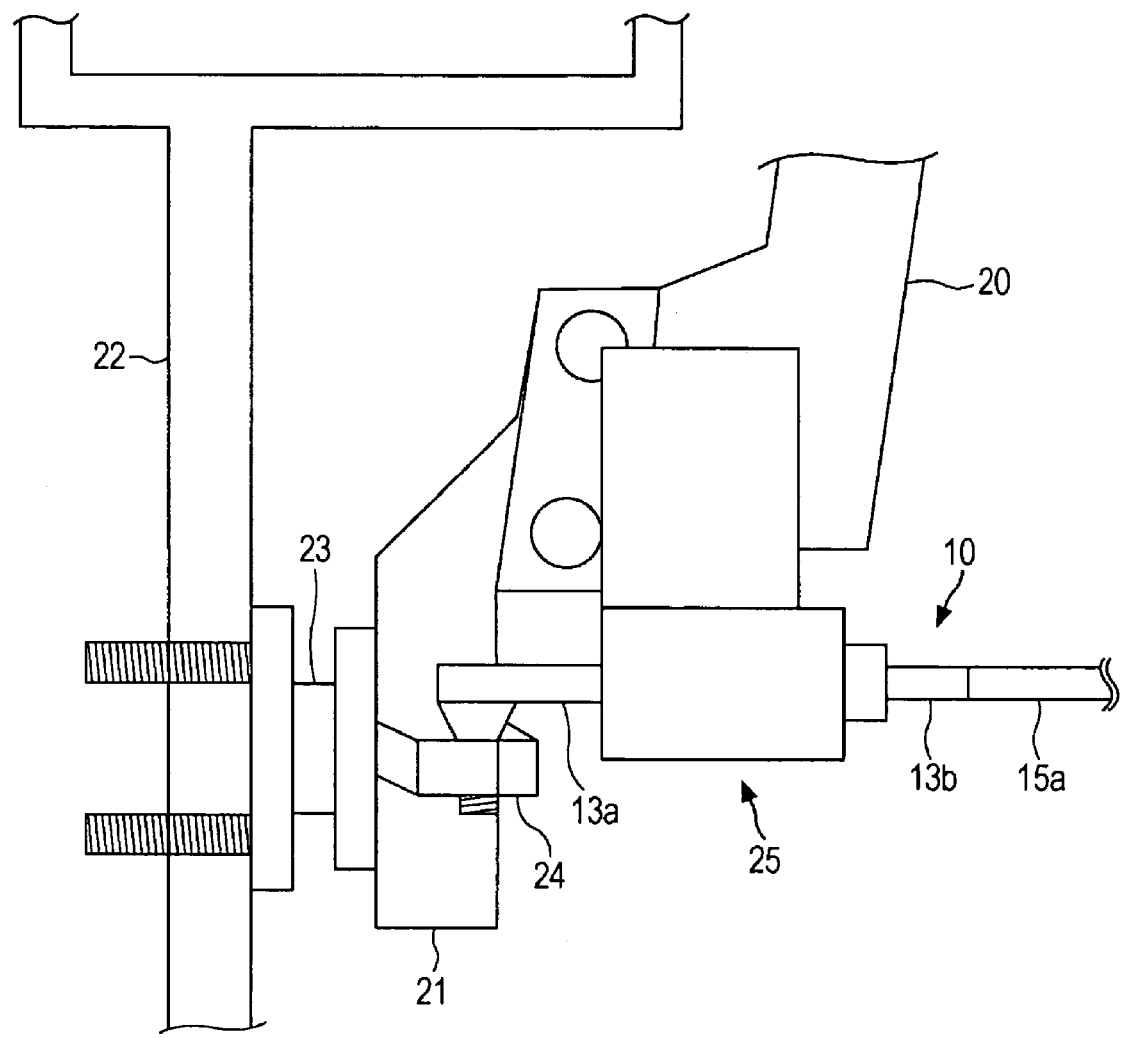
FIG. 3 is a schematic enlarged view of an area surrounding one of tie rods according to the first embodiment.
Figure 4:
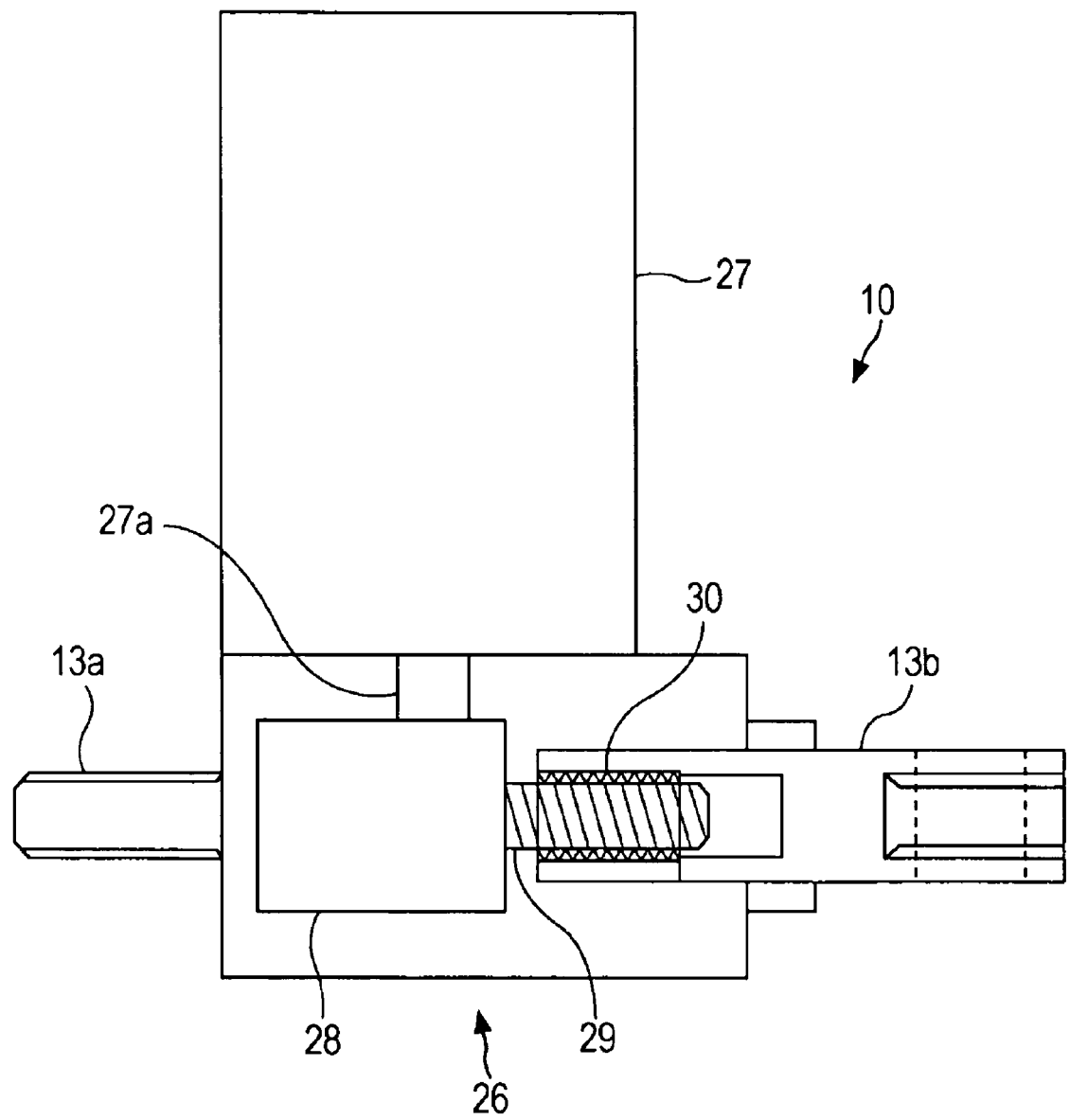
FIG. 4 illustrates the telescopic mechanism portion for one of the tie rods according to the first embodiment.

FIG. 2 illustrates the layout of one of telescopic mechanism portions. FIG. 3 is a schematic enlarged view of an area surrounding one of tie rods. FIG. 4 illustrates the telescopic mechanism portion for one of the tie rods. FIG. 5 is a flow chart of a failure diagnosis process.

Referring to FIG. 1, a left-right independent steering device 10 mainly includes tie rods 13 and 14 respectively linked to left and right front wheels 11 and 12 and axially expandable/contractible by means of small-size telescopic mechanism portions 25, and an electric or hydraulic power-steering mechanism (PS) 15 whose opposite ends are respectively connected to the tie rods 13 and 14. The PS 15 has a steering wheel 17 linked thereto with a steering shaft 16 interposed therebetween, so as to function as a steering shaft that operates in conjunction with a steering operation.

The telescopic mechanism portions 25 for the tie rods 13 and 14 are ball-screw-type linear actuators and are symmetrically disposed at left and right positions, respectively. The following description will be directed to the tie rod 13 of the two tie rods 13 and 14. Referring to FIG. 2, the telescopic mechanism portion 25 for the tie rod 13 mainly includes a main body 26 attached to the tie rod 13 and an electric motor 27 serving as an actuator attached substantially perpendicularly to the main body 26. The telescopic mechanism portion 25 is disposed in a space between a vehicle body 18 and a tire wheel 22 and is mountable within the tire wheel 22 at a position free of, for example, suspension arms and a stabilizer. The electric motor 27 may be replaced with a hydraulic motor that can be rotated hydraulically.

In detail, referring to FIG. 3, a front hub 23 onto which the tire wheel (front wheel) 22 is mounted is suspended from a front housing 21 that receives a front strut 20. The front hub 23 is coupled to a tie-rod end 13a, serving as one end of the tie rod 13, by means of a knuckle 24. The other end of the tie rod 13 is coupled to a steering rod 15a of the PS 15 and functions as a piston rod 13b that can advance or recede in the axial direction by means of the telescopic mechanism portion 25.

Referring to FIG. 4, the main body 26 of the telescopic mechanism portion 25 accommodates therein a gear box 28 that contains a gear that rotates in conjunction with a rotary shaft 27a of the electric motor 27 and a gear group meshed with the gear. A ball-screw shaft 29 protrudes from the gear box 28 in a direction perpendicular to the extending direction of the rotary shaft 27a of the electric motor 27. A ball-screw nut 30 provided at one end of the piston rod 13b is screwed to the ball-screw shaft 29. Thus, when the ball-screw shaft 29 is rotated in response to rotation of the electric motor 27, the nut 30 causes the piston rod 13b to advance or recede, thereby increasing or decreasing the length of the tie rod 13. Accordingly, this allows for a left-right independent steering operation in which the left and right front wheels 11 and 12 can be steered independently.

The telescopic mechanism portions 25 for the tie rods 13 and 14 and the PS 15 are connected to an electronic control unit (ECU) 50. The ECU 50 is equipped with a microcomputer and a peripheral circuit, and is connected to a sensor group 51 provided in the vehicle. The sensor group 51 includes various sensors, such as a vehicle-speed sensor for detecting the vehicle speed, a wheel-speed sensor for detecting the wheel speed of the vehicle, a yaw-rate sensor for detecting the yaw rate, a G sensor for detecting the lateral acceleration, sensors for detecting vehicle conditions such as a brake switch for detecting a brake operation and a parking switch for detecting the parking position of a transmission, a sensor for detecting the driving amounts and driving conditions of the telescopic mechanism portions 25 and the PS 15, a sensor for detecting the expansion/contraction amount and expansion/contraction speed of each of the tie rods 13 and 14, and a sensor for detecting a steering angle in accordance with a steering operation performed by a driver.

The ECU 50 is connected to other in-vehicle electronic control units in a two-way communicable fashion via, for example, a network (not shown). Based on information from the sensor group 51 and control information sent from these other control units, the ECU 50 controls the telescopic mechanism portions 25 and the PS 15 so that the left and right front wheels 11 and 12 are set at optimal turning angles, thereby performing left-right independent steering control.

Regarding this left-right independent steering control, when the electric motors 27 are to be driven to adjust the lengths of the tie rods 13 and 14 by expansion/contraction, it is necessary to grasp the actual turning angles of the left and right front wheels 11 and 12. Based on this actual turning angle information and steering angle information obtained in accordance with a steering operation performed by the driver, the amounts of tie-rod lengths to be increased or decreased by expansion or contraction can be determined. Therefore, in order to implement steering control with accuracy and high reliability, it is necessary to obtain actual turning angles that are accurate and highly reliable. Other than detecting the actual turning angles with sensors provided for the respective wheels 11 and 12, the actual turning angles can be estimated from sensing values of relevant parameters.

The ECU 50 uses at least two methods to obtain the actual turning angles of the left and right wheels 11 and 12, and compares data items obtained by the methods to check whether the data items contradict each other. Based on the checked result, the ECU 50 performs failure diagnosis to determine whether or not there is a failure (defect), thereby ensuring the reliability. In this embodiment, for a case where sensors for detecting the actual turning angles are not provided, the actual turning angles are estimated using at least two methods, and the failure diagnosis is performed by comparing the estimated values. The following are examples of methods used for estimating the actual turning angles.

If the sensors for detecting the actual turning angles are provided, the failure diagnosis may be performed by comparing the detected values of the actual-turning-angle sensors with the estimated values.

A. Actual-Turning-Angle Estimation Based on Tie-Rod Expansion/Contraction Amounts A map that indicates a relationship among a driver steering angle, tie-rod expansion/contraction amounts, and actual turning angles of the left and right front wheels is prepared on the basis of preliminary simulations or tests. Using this map, the actual turning angles are estimated. As the tie-rod expansion/contraction amounts, values detected directly by sensors or calculation values derived from relevant sensor values are used as described below.

A-1. Direct Detection of Tie-Rod Expansion/Contraction Amounts

The tie-rod expansion/contraction amounts are detected using stroke sensors provided on the tie rods 13 and 14. By applying the detected tie-rod expansion/contraction amounts and the steering angle to the map used for the estimation of actual turning angles of the left and right front wheels, the actual turning angles of the left and right wheels can be estimated.

A-2. Estimation of Tie-Rod Expansion/Contraction Amounts Based on Motor Rotation Angles A rotation-angle sensor, such as a rotary encoder, is attached to the electric motor 27 of each of the telescopic mechanism portions 25 and is used for detecting a motor rotation angle of the electric motor 27. A tie-rod expansion/contraction amount is calculated from the rotation angle of the electric motor 27, a gear ratio of the gear box 28, and a ball-screw pitch. By applying the calculated tie-rod expansion/contraction amounts of the tie rods 13 and 14 and the steering angle to the map used for the estimation of actual turning angles of the left and right front wheels, the actual turning angles of the left and right wheels can be estimated.

B. Estimation of Actual Turning Angles Based on Tie-Rod-End Rotation Angles

A map that indicates a relationship between tie-rod-end rotation angles and actual turning angles of left and right front wheels is prepared on the basis of preliminary simulations or tests. Using this map, the actual turning angles are estimated. The tie-rod-end rotation angles are detected with rotation-angle sensors, such as rotary encoders, attached to the tie-rod ends of the tie rods 13 and 14.

In this embodiment, the three kinds of turning angles estimated using the above methods A-1, A-2, and B are compared. If the estimated results match with each other, it is determined that the steering control is normal, whereas if the estimated results vary from each other, it is determined that there is a failure.

The failure diagnosis mentioned above is performed in accordance with a program in the ECU 50 shown in the flow chart in FIG. 5. A process of this failure diagnosis will be described below.

The failure diagnosis process includes a first step S1 where a driver steering angle is read, a sub-process including a series of steps S21 to S23, a sub-process including a series of steps S31 to S34, and a sub-process including a series of steps S41 to S43. The three sub-processes are performed in parallel. In each sub-process, the actual turning angles of the left and right front wheels are estimated using a map having reference parameters different from those of the maps used in the other sub-processes. Although the flow chart in FIG. 5 shows as if the three sub-processes for turning-angle estimation are performed simultaneously for convenience of explanation, the three sub-processes are performed in parallel independently of one another (may be performed chronologically).

The turning-angle estimation in the series of steps S21 to S23 will be described first. In step S21, tie-rod expansion/contraction amounts are detected using the stroke sensors provided on the tie rods 13 and 14. Subsequently, step S22 is performed, which is a step for referring to a turning-angle map indicating a relationship among a driver steering angle, tie-rod expansion/contraction amounts, and actual turning angles of left and right front wheels. Based on the driver steering angle and tie-rod expansion/contraction amounts as parameters, the actual turning angles of the left and right front wheels are estimated in step S23.

Next, the turning-angle estimation in the series of steps S31 to S34 will be described. In step S31, a motor rotation angle of each of the electric motors 27 of the telescopic mechanism portions 25 is detected using the rotation-angle sensor, such as a rotary encoder, attached to the electric motor 27. In step S32, a value calculated from the rotation angle of the electric motor 27, a gear ratio of the gear box 28, and a ball-screw pitch is estimated as a tie-rod expansion/contraction amount.

The sub-process then proceeds from step S32 to step S33, which is a step for referring to a turning-angle map indicating a relationship among a driver steering angle, tie-rod expansion/contraction amounts, and actual turning angles of left and right front wheels. Based on the driver steering angle and the calculated values of the tie-rod expansion/contraction amounts as parameters, the actual turning angles of the left and right front wheels are estimated in step S34. In this case, the map may be the same as the one in step S22, or may be a separately prepared map.

The turning-angle estimation in the series of steps S41 to S43 will be described. In step S41, a rotation angle of each tie-rod end is detected using the corresponding rotation-angle sensor, such as a rotary encoder. Subsequently, step S42 is performed, which is a step for referring to a turning-angle map indicating a relationship among a driver steering angle, tie-rod-end rotation angles, and actual turning angles of left and right front wheels. Based on the driver steering angle and the tie-rod-end rotation angles as parameters, the actual turning angles of the left and right front wheels are estimated in step S43.

After the actual turning angles of the left and right front wheels are estimated, the sub-processes proceed to step S5 where the estimated values of the three kinds of actual turning angles are compared. In step S6, it is checked whether or not the estimated results vary from one another. If all of the estimated values match with one another, it is determined in step S7 that the steering control is normal, and the process ends. If any one of the estimated values of the three kinds does not match with the other estimated values, it is determined in step S8 that there is a failure. In that case, the content of the failure is recorded, and a warning is given to the driver by outputting a visual or audio warning signal. Then, the process ends.

As described above, in this embodiment, the left and right tie rods 13 and 14 are provided with small-size telescopic mechanism portions 25 that expand/contract the tie rods 13 and 14 by means of ball screws. This ensures mountability of the device to a vehicle while allowing for controlling of the turning angles of the left and right wheels in an independent manner. Consequently, with a mechanical linkage remaining between the steering wheel and the vehicle wheels, the left-right independent steering device 10 can be realized with a minimum modification to a steering mechanism of related art. This implies that the device 10 can be realized with a minimum increase in cost. In addition, since the failure diagnosis is performed on the basis of the turning angles of the wheels estimated by utilizing the characteristics of the left-right independent steering device 10 of the expandable/contractible tie-rod type, highly reliable steering control information can be obtained.

Figure 6B:
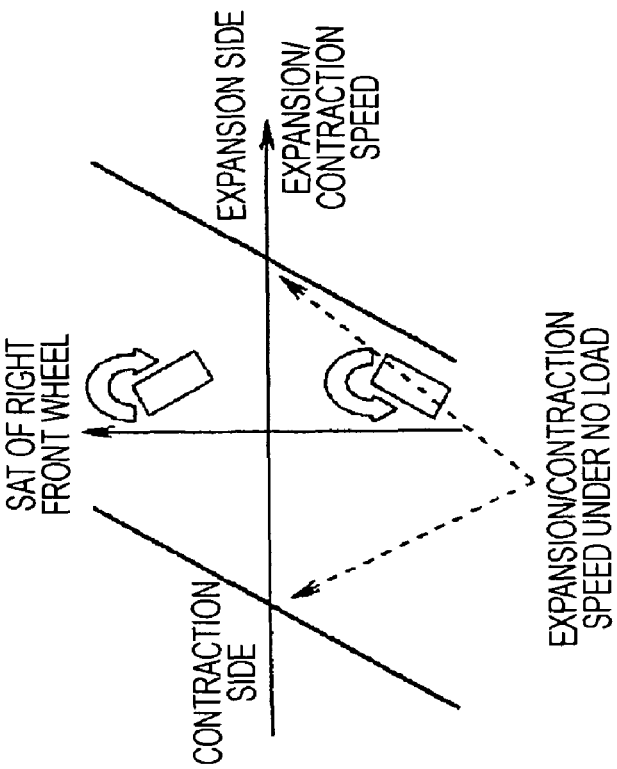
FIGS. 6A and 6B correspond to a second embodiment of the present invention and each illustrate a relationship between a tie-rod expansion/contraction speed and self-aligning torque.
Figure 6A:
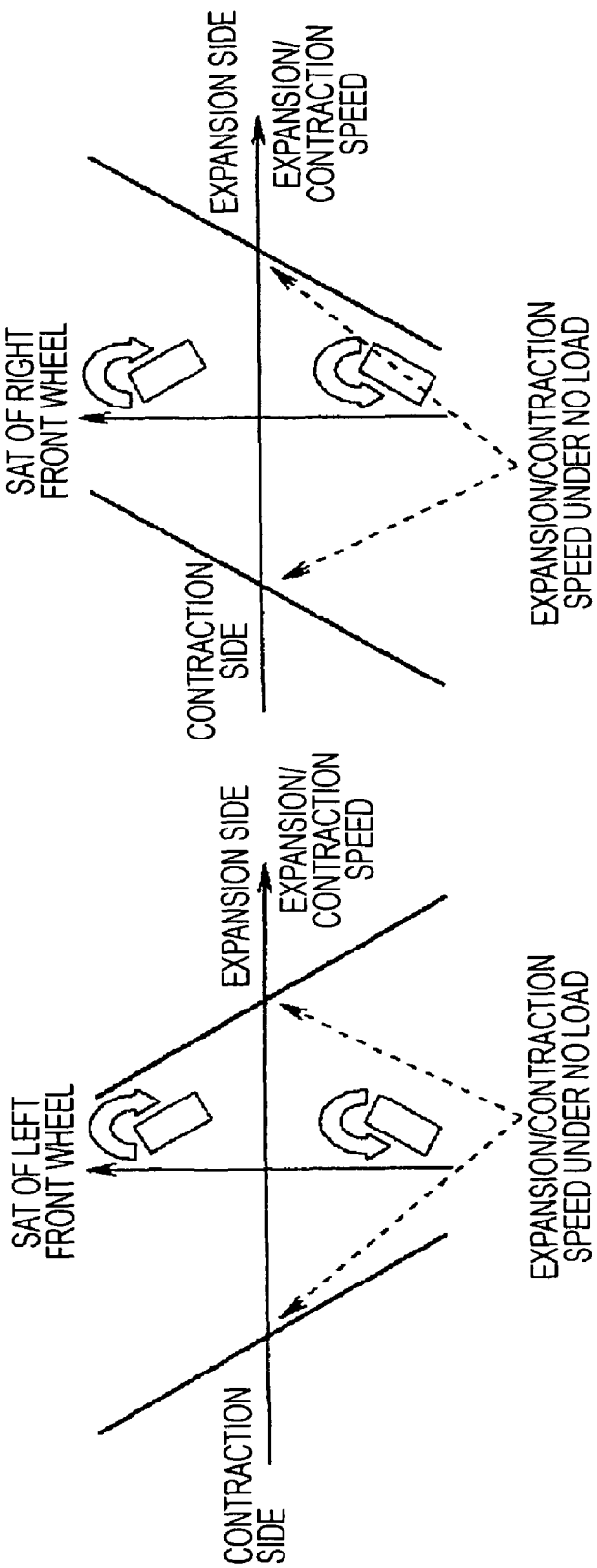
Figure 7:
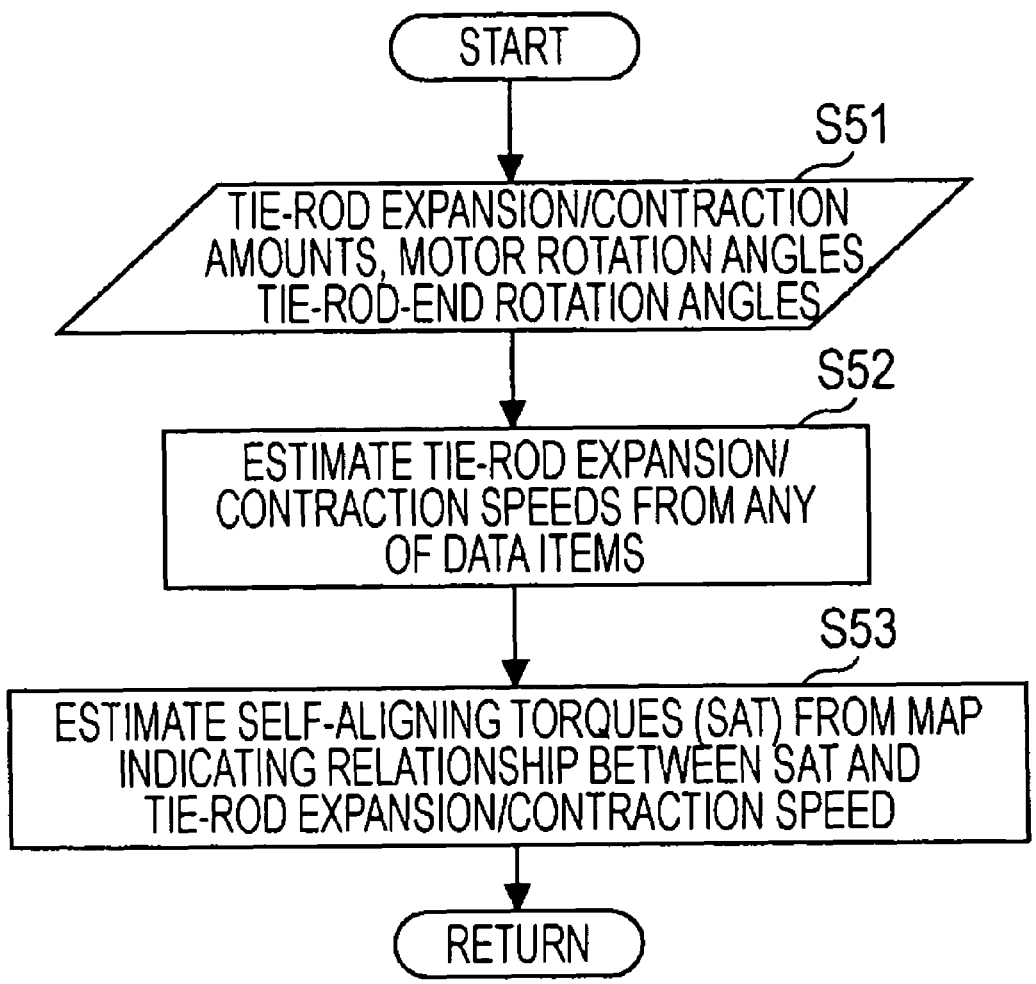
FIG. 7 is a flow chart of a process for estimating a self-aligning torque on the basis of a tie-rod expansion/contraction speed according to the second embodiment.
Figure 8A:
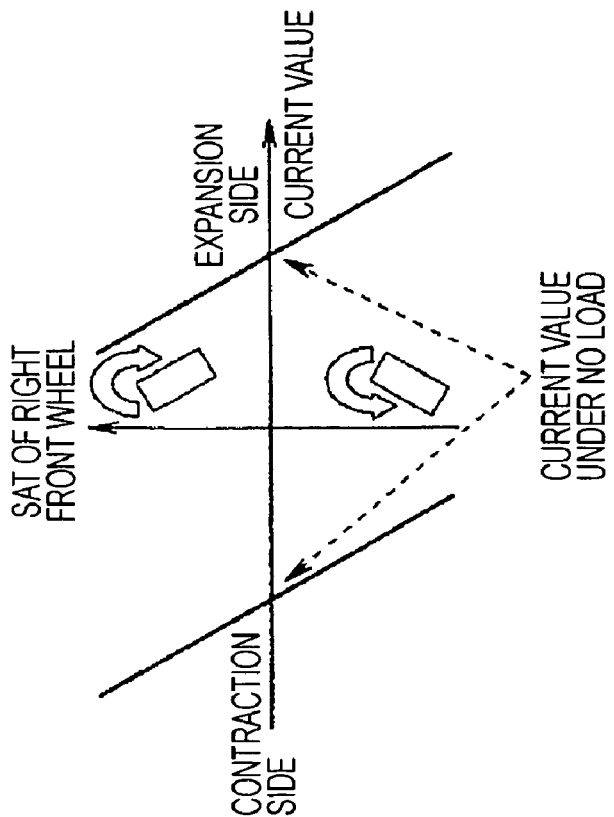
FIGS. 8A and 8B each illustrate a relationship between a motor current value and self-aligning torque according to the second embodiment.
Figure 8B:
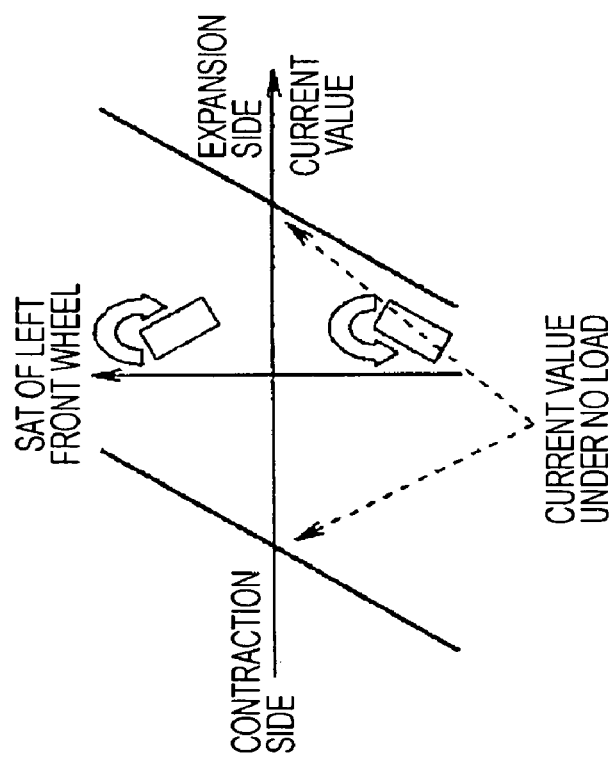
Figure 9:
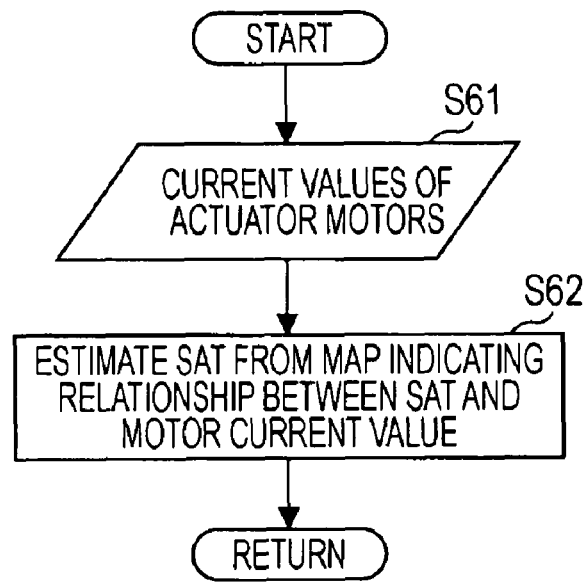
FIG. 9 is a flow chart of a process for estimating a self-aligning torque on the basis of a motor current value according to the second embodiment.
Figure 10:
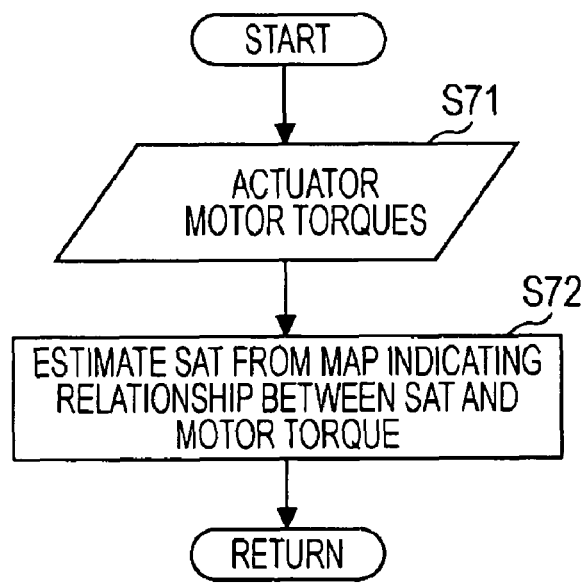
FIG. 10 is a flow chart of a process for estimating a self-aligning torque on the basis of a motor torque according to the second embodiment.

A second embodiment of the present invention will now be described. FIGS. 6A to 9 correspond to the second embodiment of the invention. FIGS. 6A and 6B each illustrate a relationship between a tie-rod expansion/contraction speed and self-aligning torque. FIG. 7 is a flow chart of a process for estimating a self-aligning torque on the basis of a tie-rod expansion/contraction speed. FIGS. 8A and 8B each illustrate a relationship between a motor current value and self-aligning torque. FIG. 9 is a flow chart of a process for estimating a self-aligning torque on the basis of a motor current value. FIG. 10 is a flow chart of a process for estimating a self-aligning torque on the basis of a motor torque.

In the left-right independent steering device 10 of the expandable/contractible tie-rod type according to the first embodiment, the driving conditions in the tie-rod telescopic mechanism, such as motor driving forces of the telescopic mechanism portions 25 and tie-rod expansion/contraction speeds, change in accordance with the magnitude of self-aligning torques (which will be referred to as an "SATs" hereinafter) generated in the tires. In the second embodiment, SATs generated in the tires are estimated by focusing on this change in the driving conditions of the tie-rod telescopic mechanism.

For example, in the steering system described in the first embodiment where the tie rods 13 and 14 are located in front of a front-wheel axle, the relationships between the tie-rod expansion/contraction speeds and SATs of the left and right front wheels are as shown in FIGS. 6A and 6B. Specifically, a tie-rod expansion/contraction speed becomes lower as an SAT becomes greater. (If the tie rods are located behind the front-wheel axle, the sign of the SATs becomes inverted). Consequently, the ECU 50 may preliminarily be equipped with a map indicating a relationship between a tie-rod expansion/contraction speed and an SAT as shown in FIGS. 6A and 6B, so that the SATs of the left and right wheels can be estimated from the tie-rod expansion/contraction speeds.

A process performed in the ECU 50 for estimating the SATs from the tie-rod expansion/contraction speeds is shown in the flow chart of FIG. 7.

In a first step S51 of the process in FIG. 7, sensing values related to tie-rod expansion/contraction amounts are read in accordance with sensors provided in the steering system. In a case where the left and right tie rods 13 and 14 are equipped with stroke sensors, the tie-rod expansion/contraction amounts are directly read. Instead of stroke sensors, if rotation-angle sensors, such as rotary encoders, are attached to the electric motors 27 of the telescopic mechanism portions 25 or to the tie-rod ends, motor rotation angles or tie-rod rotation angles detected by the rotation-angle sensors are read.

In step S52, tie-rod expansion/contraction speeds are estimated using any of the tie-rod expansion/contraction amounts, the motor rotation angles, and the tie-rod rotation angles. Each tie-rod expansion/contraction speed is estimated from a time change in a tie-rod expansion/contraction amount, or a time change in a tie-rod expansion/contraction amount based on the motor rotation-angle speed, the gear ratio of the gear box 28, and the ball-screw pitch, or a time change in a tie-rod expansion/contraction amount based on the tie-rod rotation-angle speed and the ball-screw pitch.

After the tie-rod expansion/contraction speeds are estimated, step S53 is performed, which is a step for referring to the map indicating the relationship between an SAT and a tie-rod expansion/contraction speed so as to estimate the SATs of the left and right front wheels from the tie-rod expansion/contraction speeds.

An SAT generated by a tire has an influence on the driving force of the corresponding telescopic mechanism portion 25 that expands or contacts a tie rod. A driving force of each telescopic mechanism portion 25 required for turning increases as an SAT becomes greater. Therefore, an SAT can also be estimated on the basis of the relationship an SAT has with a motor current value or a motor torque indicating the driving force of each telescopic mechanism portion 25. For example, in a steering system where the tie rods 13 and 14 are located in front of the front-wheel axle, a relationship between a motor current value and an SAT is such that a motor current value increases as an SAT becomes greater, as shown in FIGS. 8A and 8B. (If the tie rods are located behind the front-wheel axle, the sign of the SATs becomes inverted).

Accordingly, the ECU 50 may preliminarily be equipped with a map indicating a relationship between a motor current value and an SAT as shown in FIGS. 8A and 8B, so that the SATs of the left and right wheels can be estimated from the motor current values of the telescopic mechanism portions 25 expanding or contracting the tie rods 13 and 14. The same applies to a relationship between a motor torque and an SAT. In that case, by preparing a map indicating a relationship between a motor torque and an SAT, the SATs of the left and right wheels can be estimated.

A process performed in the ECU 50 for estimating the SATs from the motor current values or motor torques is shown in the flow chart of FIG. 9 or 10.

Specifically, FIG. 9 corresponds to the case where motor current values are used. In step S61, motor current values of the telescopic mechanism portions 25 are read. Subsequently, step S62 is a step for referring to the map indicating the relationship between an SAT and a motor current value so that the SATs of the left and right front wheels can be estimated from the motor current values.

The same applies to the case where motor torques are used. Specifically, in step S71 in FIG. 10, the motor torques of the telescopic mechanism portions 25 are read. Subsequently, step S72 is a step for referring to the map indicating the relationship between an SAT and a motor torque so that the SATs of the left and right front wheels can be estimated from the motor torques.

Similar to the first embodiment, the tie rods 13 and 14 in the second embodiment are provided with small-size telescopic mechanism portions 25, thereby ensuring mountability of the device to a vehicle while allowing for controlling of the turning angles of the left and right wheels in an independent manner. In addition, with the SATs of the left and right wheels estimated by utilizing the characteristics of the left-right independent steering device 10 of the expandable/contractible tie-rod type, extremely useful control information can be obtained to be used for performing slip control or turn control of the vehicle.

What is claimed is:

1. A left-right independent steering device for independently controlling turning angles of left and right wheels of a vehicle, the device comprising:
    telescopic mechanism portions provided on tie rods located at opposite ends of a steering rod mechanically connected to a steering wheel and operated in conjunction with the steering wheel, each telescopic mechanism portion being expandable and contractible by means of a ball screw so as to respectively increase and decrease a length of the corresponding tie rod;
    actuators connected to the telescopic mechanism portions so as to rotationally drive the ball screws, each actuator being disposed such that a drive shaft thereof is substantially perpendicular to an advancing/receding axis of the corresponding ball screw; and
    controlling means configured to control driving of the actuators in accordance with the steering operation.

2. The left-right independent steering device according to claim 1, wherein the telescopic mechanism portions and the actuators are disposed within the left and right wheels.

3. The left-right independent steering device according to claim 1, wherein the controlling means estimates the turning angle of each of the left and right wheels on the basis of an amount of increase or decrease in the length of the corresponding tie rod and a steering angle in accordance with the steering operation.

4. The left-right independent steering device according to claim 3, wherein the controlling means estimates the amount of increase or decrease in the length of each tie rod on the basis of a rotation angle of the corresponding actuator, a speed reduction ratio of a gear that transmits rotation of the actuator, and a screw pitch of the corresponding ball screw.

5. The left-right independent steering device according to claim 1, wherein the controlling means estimates the turning angle of each of the left and right wheels on the basis of a rotation angle of a tie-rod end of the corresponding tie rod.

6. The left-right independent steering device according to claim 1, wherein the controlling means performs a failure diagnosis process to check for a failure, the failure diagnosis process being performed by comparing a plurality of kinds of estimated values or detected values related to the turning angle of each of the left and right wheels.

7. The left-right independent steering device according to claim 1, wherein the controlling means estimates a self-aligning torque of each of the left and right wheels on the basis of a speed of increase or decrease in the length of the corresponding tie rod.

8. The left-right independent steering device according to claim 1, wherein the controlling means estimates a self-aligning torque of each of the left and right wheels on the basis of a driving force of the corresponding actuator.

9. A steering system for a vehicle, comprising:
a steering wheel directly operated by a driver;
a power steering mechanism comprising a steering rod mechanically connected to and operated by the steering wheel;
a telescopic mechanism provided between the steering rod and a tire wheel of the vehicle, wherein the telescopic mechanism comprises: a main body; a first tie rod portion provided between the main body and the tire wheel; a second tie rod portion provided between the main body and the steering rod, and with the second tie rod portion being mechanically connected to the steering rod;
an actuator provided on the main body of the telescopic mechanism so as to control a length between the first tie rod portion and the second tie rod portion; and
controlling means configured to control driving of the actuators in accordance with the steering operation.

10. The left-right independent steering device according to claim 1, wherein each of said tie rods comprises a first tie rod portion provided between a respective telescopic mechanism portion and a respective tire wheel; a second tie rod portion provided between a respective telescopic mechanism portion and an adjacent steering rod end, with each second tie rod portion being mechanically connected to an adjacent most steering rod end.

* * * * *